S. Sawyer,
Working Rattan.
N° 6,874. Patented Nov. 13, 1849.

UNITED STATES PATENT OFFICE.

SYLVANUS SAWYER, OF TEMPLETON, MASSACHUSETTS.

MACHINERY FOR SPLITTING AND DRESSING RATANS.

Specification of Letters Patent No. 6,874, dated November 13, 1849.

*To all whom it may concern:*

Be it known that I, SYLVANUS SAWYER, of Templeton, in the county of Worcester, State of Massachusetts, have invented a new and useful Machine for Cutting Cane or Ratan for Chairs or other Purposes for which it may be used; and I hereby declare the following to be a full and exact description of the construction and operation of the same, reference being had to the accompanying drawings, as forming part of this specification.

Figure 1:
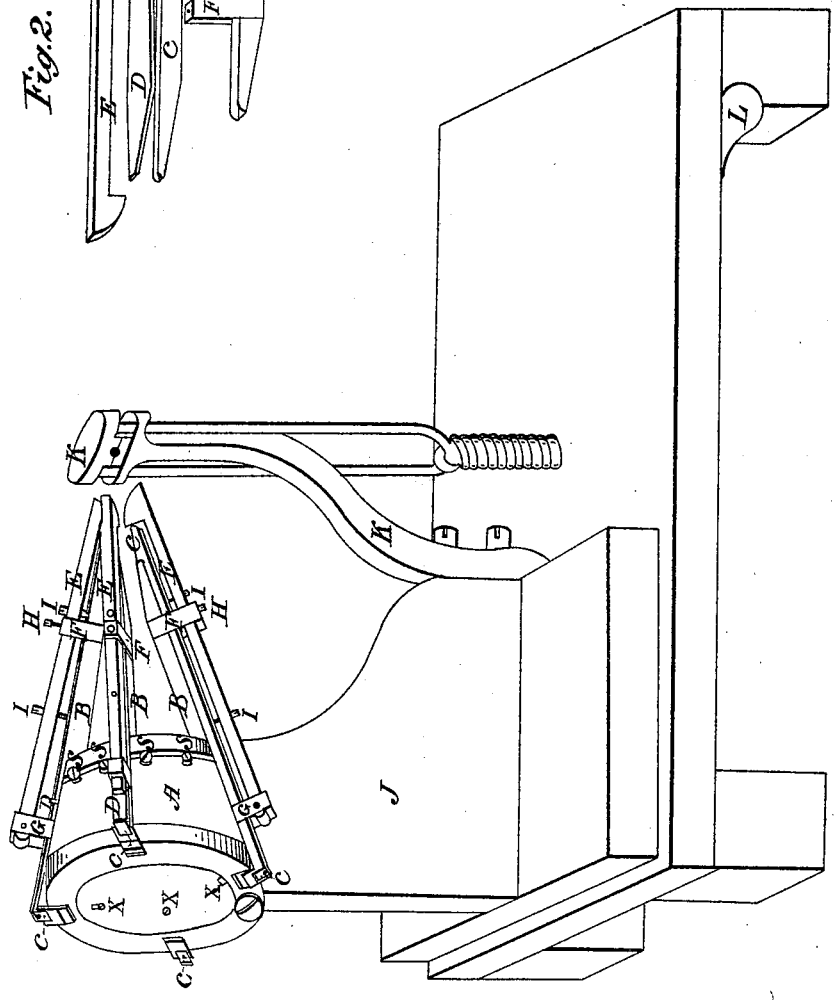

In Figure 1 A represents the head, a conical iron cylinder with grooves in the outer surface to receive the cutter beam.

Figure 2:
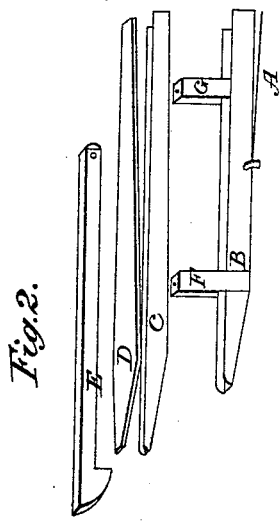

B is the cutter beam the use of which is to hold the cutter C and also the cap D and the guide E by means of the loops F and G the whole vibrating as the case may require by the means of the spring A as shown in Fig. 2, detached and operated by the set screws X X X the beam being secured in the groove by a fulcrum pin passing through the beam and made fast in a groove near the small end of the head by the set screws S, S, S, S, forming a vibrating cutter and guide.

C the cutter is formed with a bevel groove in the top and sharpened at one end as shown in Fig. 2 detached, and is inserted in a groove in the beam B, and must be moved outward as it wears to keep the point at the same distance from the fulcrum.

D the cap is made of a thin plate of steel to cover the cutter C, as shown in Fig. 2, detached.

E, is the guide formed of steel, with a hook at one end, as shown in Fig. 2 detached, the other end being made fast in the loop G, by a pin, the hook end passing through the loop F, the hook coming in front of the cutter C, and set or regulated by the set screws H, H.

I, I, are set screws passing through the guide and resting on the cap D, holding that and the cutter C, firmly in place.

J, is the stand on which the heads are placed by the means of a dovetail.

K is another guide standing in front of the vibrating cutters and guides the top of which is elevated by a treadle L under the bench to introduce the cane and held down by a spring or weight, guiding and holding the stick firmly in place as it passes through the whole placed on a bench as seen in the model and drawings.

The advantage and operation of this machine as combined is very easy and simple. A stick of cane or ratan being introduced through the guide K passes against the vibrating guides and cutters; each cutter taking from the surface of the stick a part or a strand according to its width for which it may be used, the set of the guide regulating the thickness.

This machine as it now operates saves nearly one fourth of the stock and a large amount of labor, and gets out the cane better than any other way now in use.

What I claim as my invention and desire to secure by Letters Patent is—

The principle and combination of the vibrating cutter and guide; to use any number required to remove the whole surface of the cane or ratan, dividing the surface into any required number of strands.

SYLVANUS SAWYER.

Witnesses:
D. A. CALKINS,
S. D. AMADON.